(12) United States Patent
Abe

(10) Patent No.: US 8,106,631 B2
(45) Date of Patent: Jan. 31, 2012

(54) CHARGE CONTROL DEVICE FOR BATTERIES

(75) Inventor: Kunihiro Abe, Higashimurayama (JP)

(73) Assignee: Denso Corporation, Kariya (JP)

( * ) Notice: Subject to any disclaimer, the term of this patent is extended or adjusted under 35 U.S.C. 154(b) by 649 days.

(21) Appl. No.: 12/068,639

(22) Filed: Feb. 8, 2008

(65) Prior Publication Data

US 2008/0191664 A1 Aug. 14, 2008

(30) Foreign Application Priority Data

Feb. 14, 2007 (JP) ................................. 2007-033795

(51) Int. Cl.
*H02J 7/00* (2006.01)
*G11C 16/04* (2006.01)
(52) U.S. Cl. .................................. 320/137; 365/185.11
(58) Field of Classification Search .................... 320/137
See application file for complete search history.

(56) References Cited

U.S. PATENT DOCUMENTS

| | | | | |
|---|---|---|---|---|
| 6,064,593 | A | * | 5/2000 | Matsubara et al. ...... 365/185.11 |
| 6,091,658 | A | * | 7/2000 | McDonald et al. ........... 365/228 |
| 6,127,810 | A | * | 10/2000 | Sato et al. ..................... 320/148 |
| 2003/0041217 | A1 | * | 2/2003 | Terada et al. ................. 711/154 |
| 2003/0095450 | A1 | * | 5/2003 | Tanaka .......................... 365/200 |
| 2004/0233717 | A1 | * | 11/2004 | Morikawa et al. ....... 365/185.11 |

FOREIGN PATENT DOCUMENTS

| | | |
|---|---|---|
| JP | A-62-283497 | 12/1987 |
| JP | A 6-272611 | 9/1994 |
| JP | 7-119538 A | 5/1995 |
| JP | A-2001-123874 | 5/2001 |
| JP | A-2002-138895 | 5/2002 |
| JP | A-2005-192275 | 7/2005 |

OTHER PUBLICATIONS

Japanese Office Action issued Jan. 27, 2009.
Japanese Office Action issued in Japanese Patent Application No. 2007-033795 on Sep. 1, 2009.

* cited by examiner

*Primary Examiner* — M'Baye Diao
(74) *Attorney, Agent, or Firm* — Oliff & Berridge, PLC

(57) ABSTRACT

In a charge control device installable in a motor vehicle and designed to execute charge control for a battery based on an output power of a power generator, a nonvolatile memory stores therein data required to execute the charge control for the battery. A communication circuit is communicably connectable to first and second devices different from each other. The first device allows entrance of information required to rewrite the data stored in the nonvolatile memory. A rewriting unit rewrites the data stored in the nonvolatile memory based on the entered information only when the first device is communicably connected to the communication circuit.

13 Claims, 9 Drawing Sheets

CHARGE CONTROL DEVICE FOR BATTERIES

CROSS REFERENCE TO RELATED APPLICATIONS

This application is based on Japanese Patent Application No. 2007-033795 filed on Feb. 14, 2007. The descriptions of the Patent Application are all incorporated herein by reference.

FIELD OF THE INVENTION

The present invention relates to charge control devices for batteries to be installed in motor vehicles; these systems are capable of controlling charge of a battery. More particularly, the present invention relates to such charge control devices that store data required to control charge of a battery.

BACKGROUND OF THE INVENTION

Batteries to be installed in motor vehicles are used as a source of energy in a vehicle when the engine, and hence the alternator is not running. For example, when the engine speed is slow or the engine is not running, the battery works to provide a voltage of the battery to vehicle loads. On the other hand, when the engine is running, the alternator works to supply an output voltage thereof to both the vehicle loads and the battery, thus charging the battery.

Charge control devices for batteries are therefore designed to control the state of charge (SOC) of a battery based on all operating states of a motor vehicle so as to stably supply electric power to vehicle loads and charge the battery.

The SOC of the in-vehicle battery varies because of various factors including, for example, driver-installed accessories, the use environment of the motor vehicle, and the driver's driving-behavior. The use environment of a motor vehicle represents information of how the motor vehicle is normally used by drivers. For example, the use environment of a motor vehicle represents information of the normal use of the motor vehicle, such as commuting, shopping, or long-distance transport on an expressway.

The variation in the SOC of a battery makes it difficult to properly control the charge of batteries to be installable in various motor vehicles on the basis of common programs and data required to execute the battery-charge control.

On the other hand, some types of engine control systems are disclosed in Japanese Patent Application Publications No. H06-272611 and No. H07-119538. In the engine control systems of these types, a nonvolatile memory is installed. In the nonvolatile memory, programs and data required to control an engine are stored in advance. The nonvolatile memory is designed to be externally rewritable.

After such an engine control system is placed on the market, it is possible to rewrite the control programs and data stored in the nonvolatile memory.

In order to implement the external rewriting, the engine control system has installed therein a dedicated communication circuit for communicating with a memory writer as an example of external devices. Connectors have also been installed in the respective dedicated communication circuit and the memory writer for specifically connecting therebetween. Furthermore, a wire is required to connect between the dedicated communication circuit and the memory writer.

These additional components required for the engine control system to communicate with the memory writer may increase the scale of the engine control system, resulting an increase in cost thereof.

SUMMARY OF THE INVENTION

In view of the background, an object of at least one aspect of the present invention is to provide charge control devices, which are capable of rewriting data installed beforehand therein and required to control charge of a battery installed in a vehicle without increasing the charge control devices in scale and/or cost.

According to one aspect of the present invention, there is provided a charge control device installable in a motor vehicle and designed to execute charge control for a battery based on an output power of a power generator. The charge control device includes a nonvolatile memory configured to store therein data required to execute the charge control for the battery. The charge control device includes a communication circuit communicably connectable to first and second devices different from each other. The first device allows entrance of information required to rewrite the data stored in the nonvolatile memory. The charge control device includes a rewriting unit configured to rewrite the data stored in the nonvolatile memory based on the entered information only when the first device is communicably connected to the communication circuit.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
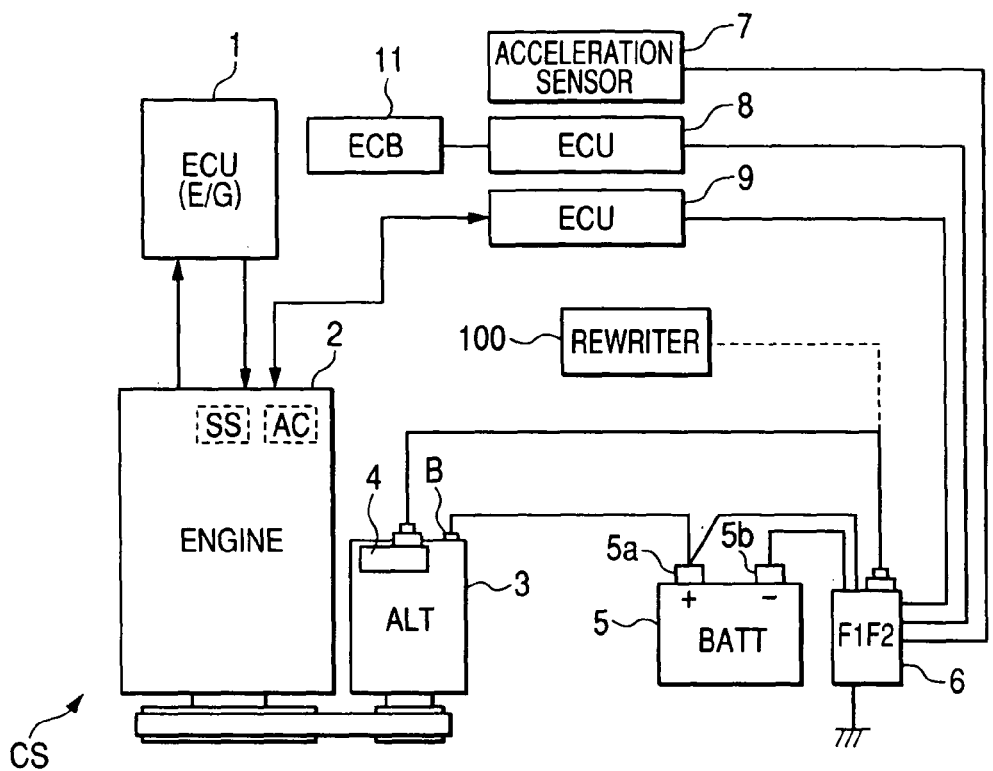
FIG. 1 is a block diagram schematically illustrating an example of the structure of a charging system including a charge control device according to an embodiment of the present invention.

Referring to FIG. 1, there is provided a charging system CS installed in a motor vehicle (referred to simply as "vehicle") and equipped with a charge control device (CC) 6 according to the embodiment of the present invention. To the charge control system 6, a predetermined ID is allocated.

The charging system CS includes an electronic control unit ECU 1 for controlling an engine 2 of the vehicle, an alternator (ALT) 3 as an example of power-generators, a battery (BATT) 5, and the charge control device 6. The charging system CS also includes an acceleration sensor 7, a brake ECU (ECB) 8, and a fuel control ECU 9. A rewriter 100 illustrated in FIG. 1 is an example of external devices. To the rewriter 100, a predetermined ID is allocated.

The ECU 1 is connected to sensors SS for measuring parameters associated with the operating state of the vehicle, such as the engine 2 thereof. The sensors SS include, for example, a crankshaft sensor for measuring the rotating state of the crankshaft of the engine 2. The ECU 1 is also connected to the charge control device 6.

The ECU 1 is operative to control the engine 2 while monitoring the parameters measured by the sensors SS, and operative to send, to the charge control device 6, at least one of the parameters associated with the operating state of the vehicle. In the embodiment, the ECU 1 is operative to send, to the charge control device 6, as the rotating state of the crankshaft of the engine 2, an engine-speed signal indicative of the rotational speed of the crankshaft (engine speed) measured by the crankshaft sensor.

The alternator 3 is equipped with a rotor and a stator. A field winding (see "3A" in FIG. 5 hereinafter) is wound around a core of a rotor to create field poles (north and south poles) alternately arranged when energized. The rotor is coupled to the crankshaft of the engine 2 through a drive belt or the like to be rotatable therewith.

The alternator 3 is provided with multi-phase stator windings (such as, three-phase stator windings, see "3B" in FIG. 5) wound around a stator core that surrounds the rotor.

The alternator 3 is provided with a rectifier for rectifying an output voltage thereof.

In the alternator 3, when the field winding is energized while the rotor rotates with rotation of the crankshaft, the rotating field windings create magnetic fluxes. The created magnetic fluxes magnetize the core to provide the field poles.

The rotation of the filed poles creates magnetic fluxes, and the created magnetic fluxes induce an AC voltage in the stator windings. The rectifier rectifies the AC voltage induced in the stator windings to a direct current (DC) voltage. The rectified DC voltage is output from an output terminal B of the alternator 3.

The alternator 3 is equipped with a voltage regulator (voltage control unit) 4. To the voltage regulator 4, a predetermined ID is allocated.

The voltage regulator 4 is operative to adjust the amount of the field current to be supplied to the field winding to thereby regulate the output voltage of the alternator 3.

The voltage regulator 4 is communicably connected to the voltage regulator 4 via a communication bus (bus cable) 20.

For example, the battery 5 consists of a plurality of cells connected in series. The battery 5 also consists of a positive electrode (terminal) 5a connected to the positive end of the series-connected cells, and a negative electrode (terminal) 5b connected to the negative end thereof. The positive terminal of the battery 5 is connected to the output terminal B of the alternator 3. The output terminal B of the alternator 3 is also connected to various electrical loads (not shown) installed in the vehicle.

Specifically, the DC voltage output from the alternator 3 is supplied to the electrical loads for driving them, and to the battery 5 for charging it.

The charge control device 6 is connected to the positive and negative terminals 5a and 5b of the battery 5 and to the acceleration sensor 7, the brake ECU 8, and the fuel ECU 9. The charge control device 6 is operative to monitor the SOC (state of charge) of the battery 5 and to control, in cooperation with the voltage regulator 4, the output voltage of the alternator 3 based on the operating state of the vehicle.

The acceleration sensor 7 is so arranged in the vehicle as to measure an acceleration thereof associated with the operating state of the vehicle.

The brake ECU 8 is connected to an electronically controlled brake system 11 consisting of, for example, disc or drum brakes at each wheel of the vehicle. Each of the brakes works to apply braking force to a corresponding one of the wheels of the vehicle so as to slow down it.

Specifically, the brake ECU 8 is programmed to send, to each of the brakes, a deceleration signal indicative of a braking force to be applied from each brake to a corresponding one of the wheels in response to a brake pedal of the vehicle being depressed by the driver. This causes each brake to slow down the vehicle based on the sent deceleration signal. The brake ECU 8 is also programmed to send, to the charge control device 6, the deceleration signal associated with the operating state of the vehicle.

The fuel control ECU 9 is connected to actuators AC, such as fuel injectors and an electric throttle, of the engine 2 and to the charge control device 6 and the sensors SS. The fuel control ECU 9 is operative to control the actuators AC based on the operating state of the vehicle measured by the sensors SS to thereby adjust an injection quantity from each injector of the engine 2.

For example, when the RPM of the engine 2 is equal to or greater than a predetermined RPM with an accelerator pedal of the vehicle being released, the fuel control ECU 9 is operative to send, to a corresponding at least one of the actuators AC, a fuel cut signal to thereby interrupt the fuel injection from the engine 2. The fuel control ECU 9 is operative to send, to the charge control device 6, the fuel cut signal.

Note that the engine ECU 1 can execute the fuel-injection control set forth above in place of the fuel control ECU 9.

The charge control device 6 has a first functional module F1 of controlling charge and discharge of the battery 5 and a second functional module F2 of controlling updates for software and data stored in the charge control device 6.

Figure 2:
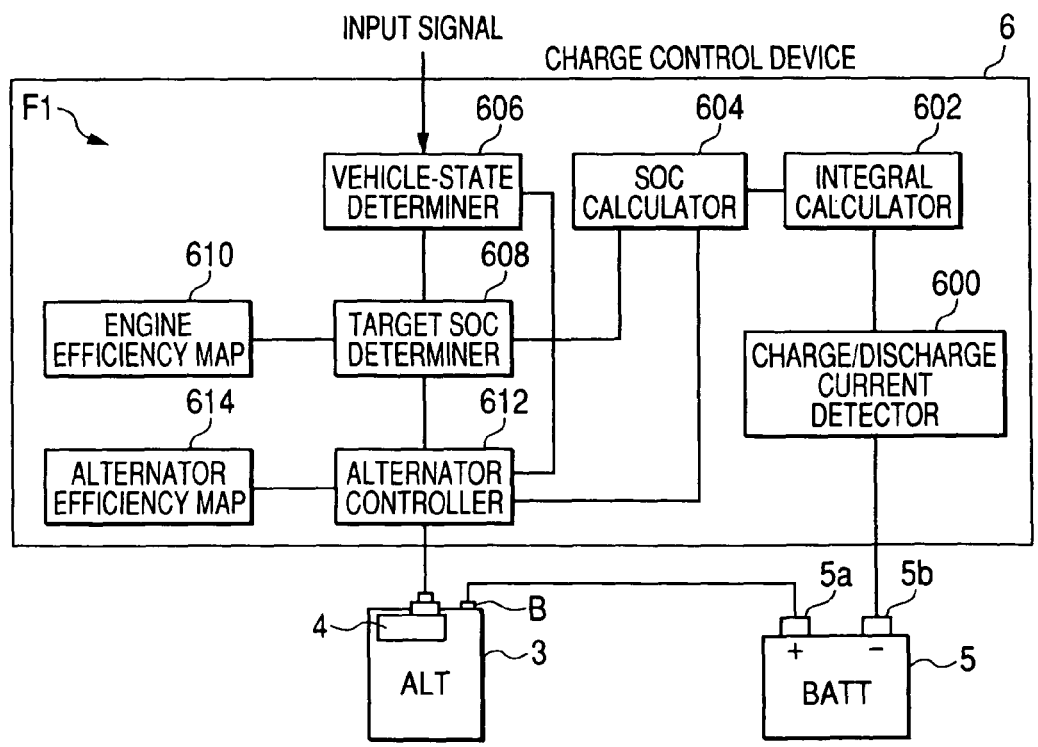
FIG. 2 is a block diagram schematically illustrating an example of a first function of the charge control device illustrated in FIG. 1.

As illustrated in FIG. 2, the first functional module F1 consists of a charge/discharge current detector 600, an integral calculator 602, a SOC calculator 604, a vehicle-state determiner 606, a target SOC determiner 608, and an alternator controller 612. These functional modules 602, 604, 606, 608, and 612 are operatively linked to each other.

As illustrated hereinafter, in the embodiment, the charge control device 6 is designed as a microcomputer system consisting of a microcomputer and its peripheries.

The charge control device 6 also includes an engine efficiency map 610 and an alternator efficiency map 614 as a data table and/or a program stored therein.

The charge/discharge detector 600 works to, for example, periodically detect a charge current (for example, positive current) to the battery 5 or a discharge current (negative current) therefrom.

The integral calculator 602 works to calculate and update the integral of the individual values of the charge and discharge currents every time a value of the charge current or discharge current is newly detected by the charge/discharge detector 600.

The SOC calculator 604 works to calculate and update the SOC of the battery 5 based on the updated integral of the individual values of the charge current and the discharge current using one of various methods of calculating the SOC.

For example, when a key switch of the vehicle is turned off in response to, for example, pullout of an ignition key of the vehicle from a key cylinder thereof by the driver, the SOC calculator 604 stores in the charge control device 6 a present value of the SOC calculated by the SOC calculator 604. Thereafter, when the key switch is turned on in response to, for example, insertion of the ignition key into the key cylinder by the driver, the SOC calculator 604 starts to update the stored value of the SOC based on the updated integral of the individual values of the charge current and the discharge current calculated by the integral calculator 602.

The vehicle-state determiner 606 works to determine the operating state of the vehicle based on input signals sent from the acceleration sensor 7, the brake ECU 8, and the fuel control ECU 9, respectively. The input signals include at least one of the parameters measured by the sensors SS, the deceleration signal sent from the brake ECU 8, and the fuel cut signal sent from the fuel control ECU 9.

For example, in the embodiment, the operating state of the vehicle can change to "deceleration state", "abnormal state", or "efficient power-generation state".

The deceleration state represents the state of the vehicle during deceleration.

The abnormal state represents the state of the vehicle in which at least one of the input signals to the charge control device 6 is lost or goes out of a proper region previously determined therefor.

The efficient power-generation state represents the state of the vehicle except for the deceleration state and the abnormal state.

Note that the vehicle-state determiner 606 can determine the operating state of the vehicle based on at least one of the input signals sent from the acceleration sensor 7, the brake ECU 8, and the fuel control ECU 9. Thus, when the vehicle-state determiner 606 executes the determination of the operating state of the vehicle using one of the input signals sent from the acceleration sensor 7, the brake ECU 8, and the fuel control ECU 9, it is possible to omit entrance of the remaining input signals into the charge control device 6.

The target SOC determiner 608 works to determine the target SOC when the operating state of the vehicle determined by the vehicle state determiner 606 is in the efficient power-generation state.

Figure 3:
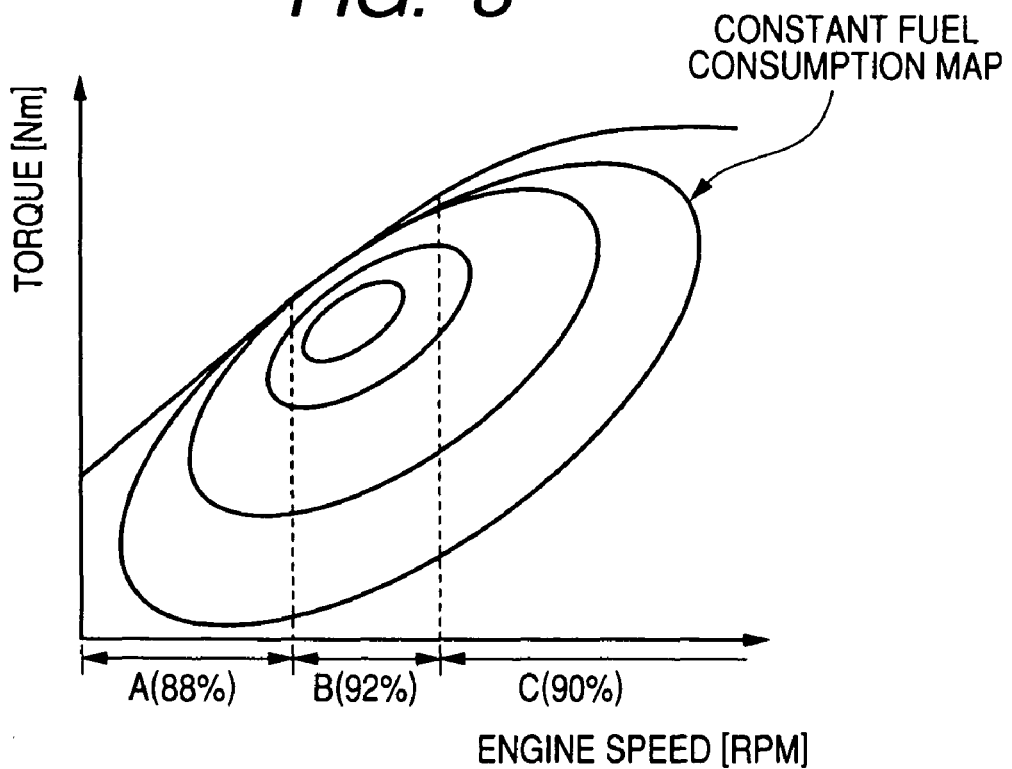
FIG. 3 is a graph visually illustrating an engine efficiency map illustrated in FIG. 2.

FIG. 3 schematically represents an example of the graph visually illustrating the engine efficiency map 610 according to the embodiment. In FIG. 3, the horizontal axis of the graph represents the engine speed (RPM: Revolutions Per Minutes), and the vertical axis represents torque (Nm) generated by the engine 2.

As illustrated in FIG. 3, the engine efficiency map 610 represents constant fuel consumption curves each as a function of the engine speed and the torque. The constant fuel consumption curves each have a substantially ellipsoidal shape.

When the length of the major axis of one of the constant fuel consumption curves is smaller than that of the length of the major axis of another one of the constant fuel consumption curves, the engine efficiency corresponding to the one of the constant fuel consumption curves is higher than that corresponding to another one of the constant fuel consumption curves.

The constant fuel consumption curves (engine efficiency map 610) are divided into three zones A, B, and C in the order of ascending engine-speeds.

The target SOC for the zone A of the engine efficiency map 610 has been determined to 88 percent when the SOC of the fully charged battery 5 is determined to 100 percent.

Similarly, the target SOC for the zone B of the engine efficiency map 610 has been determined to 92 percent, and the target SOC for the zone C of the engine efficiency map 610 has been determined to 90 percent.

Specifically, the target SOC determiner 608 works to:

specify the present engine speed based on the engine-speed signal supplied from the ECU 1; and references the engine efficiency map 610 using the specified engine speed to thereby determine the target SOC corresponding to the present engine speed.

The alternator controller 612 works to determine a target regulated voltage and/or a target field-current value based on the determined operating state of the vehicle, the determined target SOC, and the alternator efficiency map 612, thus sending, to the voltage regulator 4, a power-generation control signal including the target-regulated voltage for controlling the output power of the alternator 3.

Figure 4:
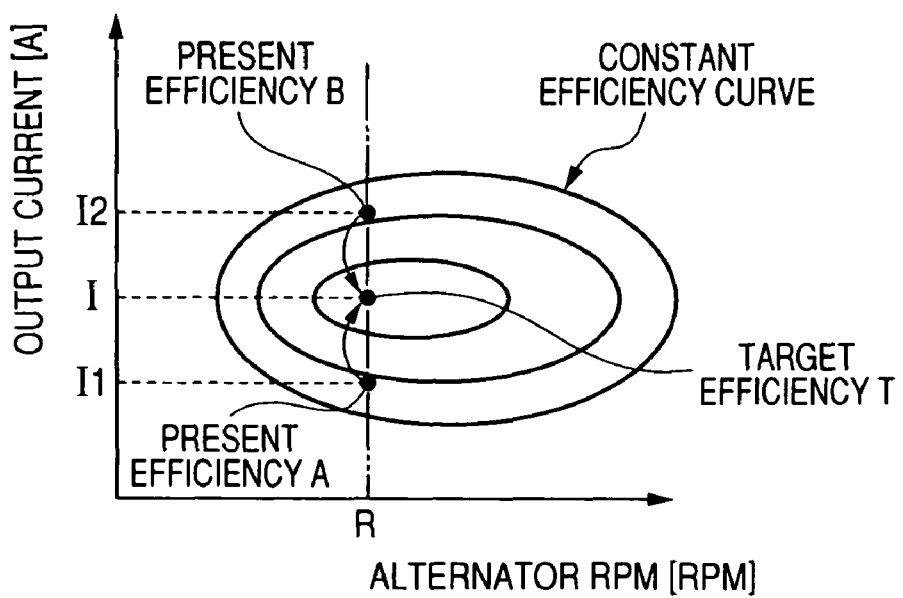
FIG. 4 is a graph visually illustrating an alternator efficiency map illustrated in FIG. 2.

FIG. 4 schematically represents an example of the graph visually illustrating the alternator efficiency map 614 according to the embodiment. In FIG. 4, the horizontal axis of the graph represents the RPM of the rotor of the alternator 3, referred to simply as "alternator RPM", and the vertical axis represents an output current (Ampere) of the alternator 3.

As illustrated in FIG. 4, the alternator efficiency map 614 represents constant power-generation efficiency curves each as a function of the alternator RPM and the output current. The constant power-generation efficiency curves each have a substantially ellipsoidal shape.

When the length of the major axis of one of the constant power-generation efficiency curves is smaller than that of the length of the major axis of another one of the constant power-generation efficiency curves, the power generation efficiency of the alternator 3 corresponding to the one of the constant power-generation efficiency curves is higher than that corresponding to another one thereof.

FIG. 4 also illustrates how to improve the present power generation efficiency while keeping the alternator RPM constant based on the alternator efficiency map 614.

For example, let us assume that the alternator 3 generates output power at a value R of the alternator RPM and a value I1 of the output current; these values R and I1 correspond to a present power generation efficiency (present efficiency) A illustrated in FIG. 4.

In this assumption, the alternator controller 612, in cooperation with the voltage regulator 4, increases the output current at a value I corresponding to a target power generation efficiency (target efficiency) T while maintaining the alternator RPM at the same value R. This allows the power generation efficiency of the alternator 3 to shift to a state in which the power generation efficiency at the value R of the alternator RPM R is the highest.

In addition, let us assume that the alternator 3 generates output power at the value R of the alternator RPM and a value I2 of the output current; these values R and I2 correspond to a present efficiency B illustrated in FIG. 4.

In this assumption, the alternator controller 612, in cooperation with the voltage regulator 4, reduces the output current at the value I corresponding to the target efficiency T while maintaining the alternator RPM at the same value R. This allows the power generation efficiency of the alternator 3 to shift to the state in which the power generation efficiency at the value R of the alternator RPM R is the highest.

Figure 5:
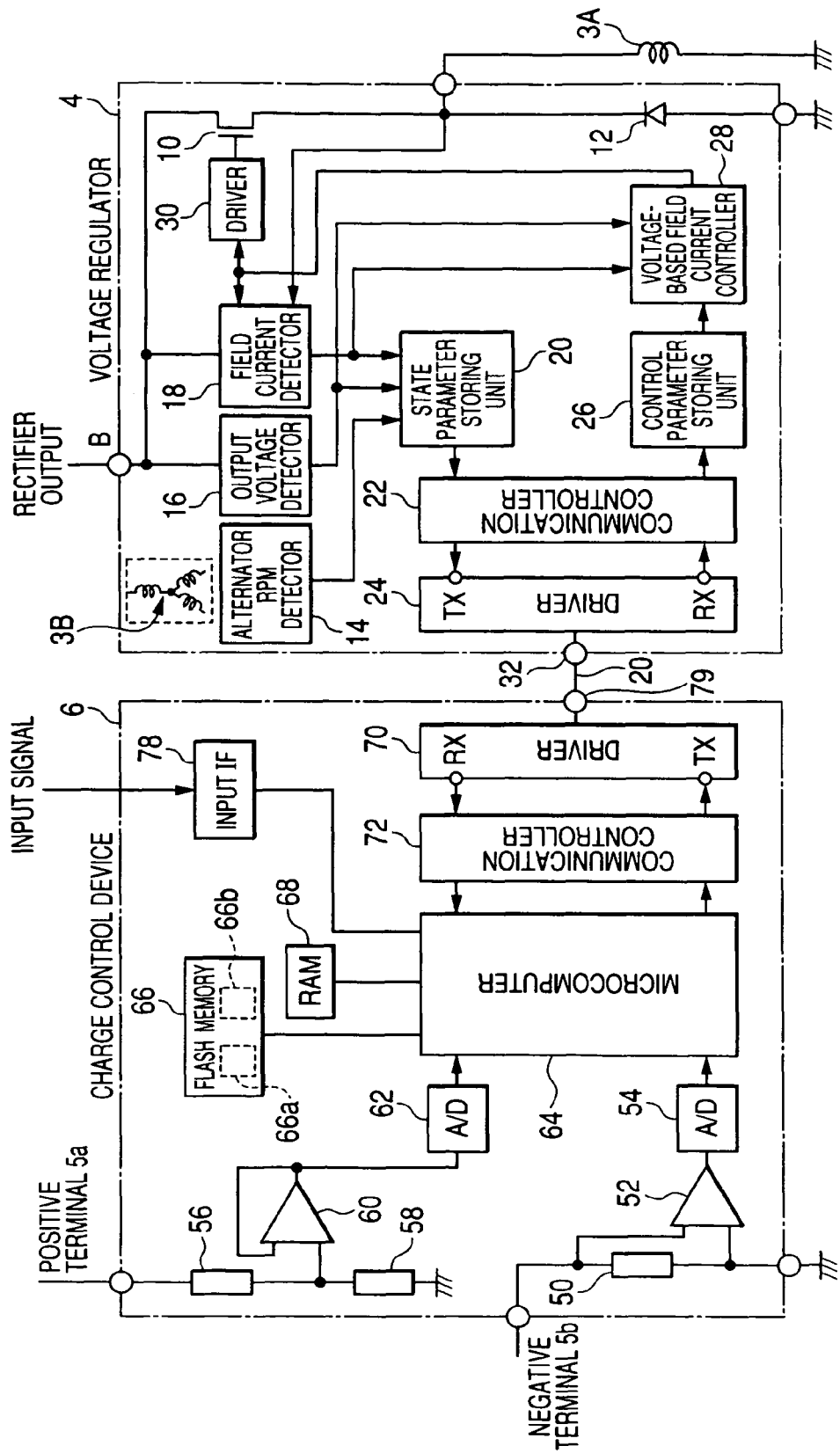
FIG. 5 is a diagram schematically illustrating a specific example of the circuit structure of the charge control device and that of the circuit structure of a voltage regulator illustrated in FIG. 1.

FIG. 5 schematically illustrates a specific example of the circuit structure of the charge control device 6 and that of the circuit structure of the voltage regulator 4.

Referring to FIG. 5, the voltage regulator 4 is provided with a power transistor 10, a flywheel diode 12, an alternator RPM detector 14, an output voltage detector 16, and a field current detector 18.

The voltage regulator 4 is also provided with a state parameter storing unit 20, a communication controller 22, a driver 24, a control parameter storing unit 26, a voltage-based field current controller 28, a driver 30, and a communication connector 32, such as a CAN connector.

The power transistor 10 is, for example, an NMOSFET. For example, the gate (control terminal) of the power transistor 10 is connected to the driver 30, and the source (one signal terminal) thereof is connected to one end of the field winding 3A of the alternator 3. The other end of the field winding 3A is connected to a signal ground of the voltage regulator 4.

The drain (the other signal terminal) of the power transistor 10 is connected to the output terminal B of the alternator 3. Specifically, the power transistor 10 is connected to the field winding 3A in series. Turning-on of the power transistor 10 therefore allows a field current to be supplied to the field winding 3A based on the output terminal B.

The flywheel diode 12 is so connected at its cathode to the source of the power transistor 10 and at its anode to the signal ground as to be parallel to the field winding 3A. Turning-off of the flywheel diode 12 therefore allows the field current to continue to flow through the flywheel diode 12.

The alternator RPM detector 14 works to detect the alternator RPM. For example, the alternator RPM detector 14 works to monitor a phase voltage induced in one-phase winding of the multi-phase stator windings 3B to thereby detect the RPM of the alternator RPM based on the monitored frequency of the phase voltage.

For example, because the monitored frequency of the phase voltage induced in one-phase winding of the stator windings 3B is proportional to the alternator RPM, the alternator RPM detector 14 works to detect the alternator RPM based on the proportional relationship between the alternator RPM and the monitored frequency.

The output voltage detector 16 works to detect the potential at the output terminal B of the alternator 3 as the output voltage thereof.

The field current detector 18 is connected to the output terminal B of the alternator 3 and the drain of the power transistor 10.

The field current detector 18 works to detect a value of the filed current flowing through the field winding 3A.

As one example, the field current detector 18 works to monitor the on and off state (on-duty) of the power transistor 10 and to calculate the field current value based on the monitored on and off state of the power transistor 10 and the output voltage of the alternator 3.

As another example, the field current detector 18 is provided with a shunt resistor (not shown) connected to the power transistor 10 in series for sensing the field current and operative to measure a voltage across the shunt resistor to thereby detect the filed current value based on the measured voltage across the shunt resistor.

The state parameter storing unit 20 is connected to each of the alternator RPM detector 14, the output voltage detector 16, and the field current detector 18.

The state parameter storing unit 20 is operative to:

generate a power-generation state signal (digital-modulated signal) including, as power-generation state parameters, the detected alternator RPM, the detected output voltage, and the detected field current value by, for example, modulating a carrier wave with the detected alternator RPM, the detected output voltage, and the detected field current value; and store therein the generated power-generation state signal.

The communication controller 22 is connected to the state parameter storing unit 20, the driver 24, and the control parameter storing unit 26.

The communication controller 22 is operative to:

read the power-generation state signal stored in the state parameter storing unit 20;

convert the readout power-generation state signal into a communication frame with a predetermined digital communication format, such as CAN format; and send, to the driver 24, the communication frame in which the ID of the voltage regulator 4 is contained.

The driver 24 is connected to the communication connector 32 removably connected to one end of the communication bus 20 and operative to transmit the communication frame to the charge control device 6 via the communication bus 20.

The driver 24 serves as a receiver. Specifically, the driver 24 is also operative to receive a communication frame sent from the charge control device 6 via the communication bus 20.

The communication controller 22 is also operative to convert the communication frame sent from the charge control device 6 into the power-generation control signal generated by the alternator controller 612. The communication controller 22 is operative to send the converted power-generation control signal to the control parameter storing unit 26.

The control parameter storing unit 26 is operative to receive the power-generation control signal and to store therein the target regulated voltage included in the power-generation control signal.

The voltage-based field current controller 28 is operative to:

reference the target-regulated voltage stored in the control parameter storing unit 26; and send, to the driver 30, a drive signal, such as a PWM (Pulse Width Modulated signal) drive signal.

The PWM drive signal allows the power transistor 10 to be switched on and off based on a predetermined duty cycle; this duty cycle is required to match the output voltage of the alternator 3 with the target-regulated voltage or match the field current value with a target current value based on the target-regulated voltage.

The driver 30 is operative to receive the PWM drive signal and to drive the power transistor 10 in accordance with the predetermined duty cycle of the PWM drive signal, controlling the output voltage of the alternator 3.

The charge control device 6 is provided with a shunt resistor 50, amplifiers 52 and 60, analog-to-digital (A/D) converters 54 and 62, resistors 56 and 58, a microcomputer 64, a flash memory 66, an random access memory (RAM) 68, a driver 70, a communication controller 72, an input interface 78, and a communication connector 79.

The shunt resistor 50 serves as a resistor for sensing the charge and discharge currents for the battery 5, one end of which is connected to the negative terminal 5*b* of the battery 5, and the other end of which is connected to a signal ground of the charge control device 6.

The amplifier 52 is for example a differential amplifier and operative to amplify the voltage across the shunt resistor 50. The amplified voltage is converted by the A/D converter 54 into digital data, and the digital data is input to the microcomputer 64. In the embodiment, for example, the shunt resistor 50, the amplifier 52, and the A/D converter 54 provide the charge/discharge current detector 600.

The resistors 56 and 58 constitute a voltage divider for detecting a terminal voltage of the battery 5 (battery voltage). Specifically, one end of the resistor 56 is connected to one end of the resistor 58, and the other end of the resistor 56 is connected to the positive terminal 5*a* of the battery 5. The other end of the resistor 58 is connected to the signal ground. The amplifier 60 is for example an operational amplifier serving as a buffer.

As illustrated in FIG. 5, a non-inverting input terminal of the amplifier 60 is connected to the connecting point between the resistors 56 and 58, in other words, an output terminal of the voltage divider. An inverting input terminal of the amplifier 60 is connected to an output terminal thereof.

Specifically, the amplifier 60 is operative to output a voltage following the potential at the output terminal of the voltage divider. The output voltage is converted by the A/D converter 62 into digital data, and the digital data is input to the microcomputer 64.

The communication controller 72 is connected to the microcomputer 64 and the driver 70.

The driver 70 is connected to the communication connector 79 removably connected to the other end of the communication bus 20.

The driver 70 and the communication controller 72 are arranged to communicate signals with the voltage regulator 4, and therefore, they can execute basically the same operations as the driver 24 and the communication controller 22.

Specifically, the driver 70 serves as a receiver operative to receive the communication frame transmitted from the voltage regulator 4 and to send it to the communication controller 72.

The communication controller 72 is operative to convert the communication frame sent from the voltage regulator 4 into the power-generation state signal generated by the voltage regulator 4. The communication controller 72 is operative to send the converted power-generation state signal to the microcomputer 64 so that the power-generation state signal is stored in the RAM 68 under control of the microcomputer 64.

The communication controller 72 is operative to:

read the power-generation control signal generated by the microcomputer 64 and stored in the RAM 68;

convert the readout power-generation control signal into the communication frame with the predetermined digital communication format, such as CAN format; and send, to the driver 70, the communication frame in which the ID of the charge control device 6 is contained.

The driver 70 is operative to transmit the communication frame to the voltage regulator 4 via the communication bus 20.

The input interface 78 is operative to receive the input signals sent from the acceleration sensor 7, the brake ECU 8, and the fuel control ECU 9 and to input them to the microcomputer 64 in a format processable thereby.

The flash memory 66 is an example of various types of nonvolatile memory, and has stored therein various control programs 66*a* to be executable by the microcomputer 64 and various items of control data 66*b* required to execute charge and discharge control of the battery 5. The engine efficiency map 610 and the alternator efficiency map 614 are, for example, included in the items of the control data 66*b*.

Specifically, at least one of the control programs 66*a* stored in the flash memory 66 causes the microcomputer 64 to implement all of the functional modules 602, 604, 606, 608, and 612 to thereby execute charge and discharge control of the battery 5.

In the embodiment, a rewrite (update) program has been stored in the flash memory 66. The rewrite program causes the microcomputer 64 to implement the second functional module F2 to thereby rewrite (update) the control programs 66*a* and the items of control data 66*b* stored in the flash memory 66 based on information entered from the rewriter 100.

Figure 6:
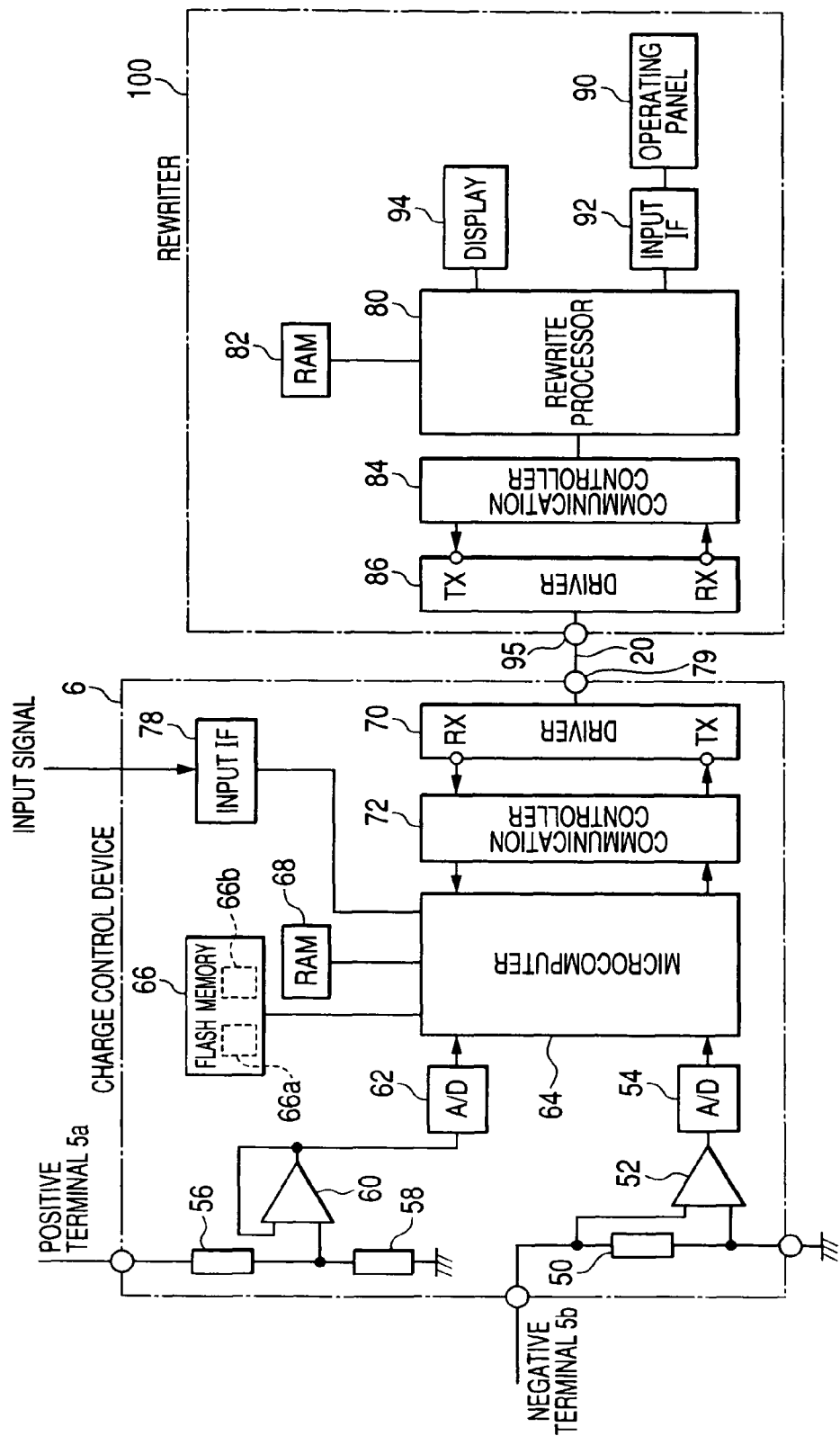
FIG. 6 is a diagram schematically illustrating a specific example of the circuit structure of a rewriter illustrated in FIG. 1 and that of the circuit structure of the charge control device according to the embodiment.

FIG. 6 schematically illustrates a specific example of the circuit structure of the rewriter 100 and that of the circuit structure of the charge control device 6.

Note that electrical connection between the charge control device 6 and the voltage regulator 4 is established when the charge control device 6 executes charge and discharge control of the battery 5 (see FIG. 5). In addition, electrical connection between the charge control device 6 and the rewriter 100 is established when the charge control device 6 executes the rewrite of the control programs 66*a* and the items of the control data 66*b* stored in the flash memory 66 (see FIG. 6).

Referring to FIG. 6, the rewriter 100 is equipped with a rewrite processor 80, a RAM 82, a communication controller 84, a driver 86, an operating panel 90, an input interface 92, a display 94, and a communication connector 95.

The driver 86 is connected to the communication connector 95 removably connected to the one end of the communication bus 20.

The driver 86 and the communication controller 84 are arranged to communicate signals with the voltage regulator 4, and therefore, they can execute basically the same operations as the driver 70 and the communication controller 72.

The rewrite processor 80 is operative to execute various tasks required to rewrite the various control programs 66*a* and the various items of the control data 66*b*.

For example, the rewrite processor 80 is operative to send, toward the charge control device 6, a rewrite instruction as a trigger of the rewrite.

The rewrite processor 80 is also operative to send, toward the charge control device 6, a new control program and/or a new item of control data to which a corresponding at least one control program and a corresponding item of control data stored in the flash memory 66 should be rewritten.

The operating panel 90 is designed as, for example, a screen of the rewriter 100. The operating panel 90 includes a plurality of user-operable buttons.

For example, after the rewriter 100 has been connected to the charge control device 6, when a user pushes one of the buttons for rewrite instruction, the operating panel 90 works to send, to the charge control device 6, the rewrite instruction. In addition, when a user pushes at least one of the remaining buttons, a new control program and/or a new item of control data to which a corresponding at least one control program 66*a* and a corresponding item of control data 66*b* stored in the flash memory 66 should be rewritten is entered to the rewrite processor 80 via the input interface 92.

The input interface 92 is operative to:

receive rewrite information indicative of the rewrite instruction, a new control program, and/or a new item of control data entered by the operating panel 90;

convert the received rewrite information into rewrite information in a format processable by the rewrite processor 80; and send, to the rewrite processor 80, the converted rewrite information.

Specifically, the rewrite processor 80 is operative to receive the rewrite information sent from the input interface 92, and to send, to the communication controller 84, the received rewrite information.

The communication controller 84 is operative to:

receive the rewrite information sent from the rewrite processor 80;

convert the received rewrite information into a communication frame with a predetermined digital communication format, such as CAN format; and send, to the driver 86, the communication frame in which the ID of the rewriter 100 is contained.

The driver 86 is connected to the communication bus 20 and operative to transmit the communication frame to the charge control device 6 via the communication bus 20.

The display 94 is operative to display the update information entered by a user with the used of the operating panel 90 and/or information indicative of the tasks being executed by the rewrite processor 80. The RAM 82 serves as a main memory for storing therein data obtained during execution of the tasks by the rewrite processor 80.

Figure 7:
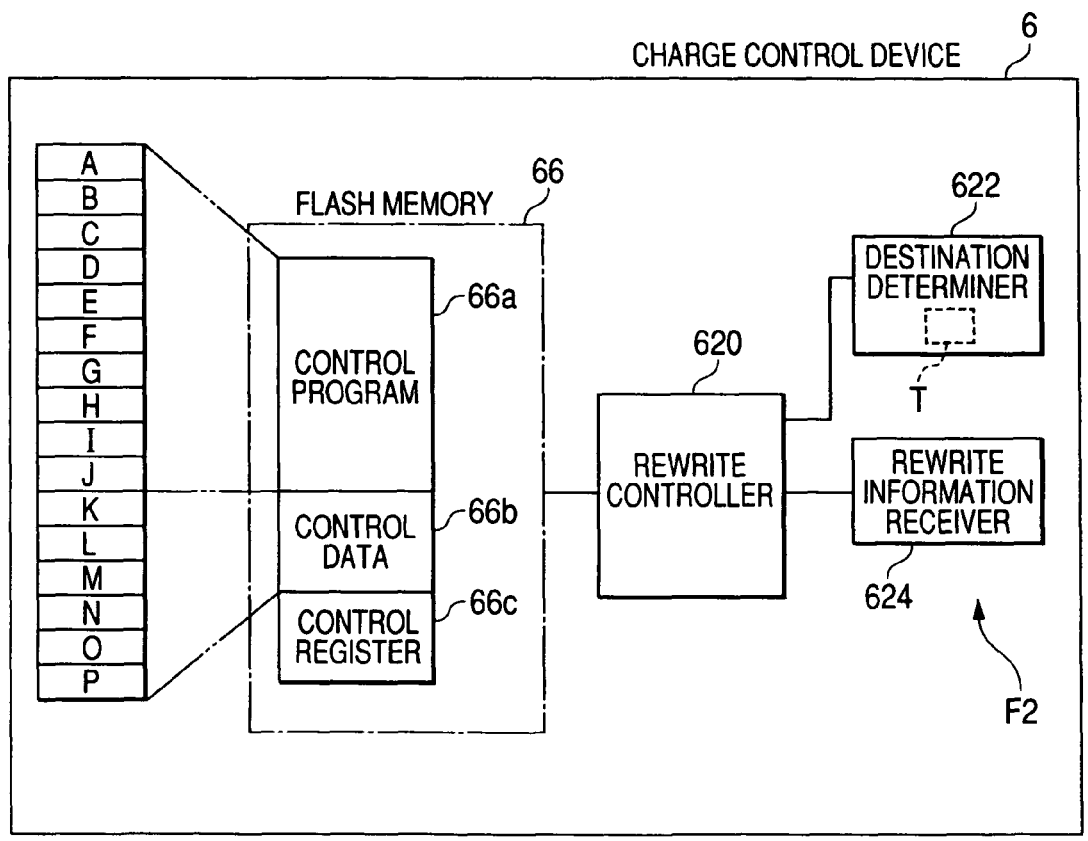
FIG. 7 is a block diagram schematically illustrating an example of a second function of the charge control device according to the embodiment.

FIG. 7 is a block diagram schematically illustrating an example of the second function F2 of the charge control device 6 for rewriting at least one control program 66a and at least one item of control data 66b stored in the flash memory 66.

As illustrated in FIG. 7, the second function F2 consists of a rewrite controller 620, a destination determiner 622, and a rewrite information receiver 624. These functional modules 620, 622, and 624 are operatively linked to each other. The rewrite program stored in the flash memory 66 causes the microcomputer 64 to implement all of the functional modules 620, 622, and 624.

The rewrite controller 620 works to rewrite at least one of the control programs 66a and/or at least one of the items of the control data stored in the flash memory 66 in blocks of a predetermined size, such as plural bits or at least one byte.

As illustrated in FIG. 7, the control programs 66a have been distributedly stored in ten regions A, B, . . . , and J of the flash memory 66; each of these ten regions A, B, . . . , J has a predetermined size equivalent to the predetermined size of each block.

Similarly, the items of the control data 66b have been distributedly stored in six regions K, L, . . . , and P of the flash memory 66; each of these six regions K, L, . . . , and P has a predetermined size equivalent to the predetermined size of each block.

In the embodiment, for example, the control programs 66a can be modularized into the ten blocks corresponding to the respective ten regions A to J. For example, each of the modules (blocks) of the control programs 66a corresponds to an independent program module.

Similarly, in the embodiment, for example, the items of the control data 66b can be modularized into the six blocks corresponding to the respective six regions K to P.

A memory region of a predetermined size of 16 bits has been allocated in the flash memory 66 as the control register 66c. One bit of the control register (memory region) 66c serves as a flag that represents whether a corresponding one of the data items stored in the respective regions A to P is allowed to be deleted.

Specifically, when one bit of the control register 66c is set to "1", the rewrite controller 620 enables a corresponding one data block stored in a corresponding one of the regions A to P to be deleted. Otherwise, one bit of the control register 66c is set to "0", the rewrite controller 620 disables deletion of a corresponding one data block stored in a corresponding one of the regions A to P.

After one data block stored in a corresponding one of the regions A to P is deleted, the rewrite controller 620 is configured to write, into the corresponding one of the regions A to P, a new control program or a new item of control data in a block sent from the rewriter 100.

In the embodiment, the rewrite instruction includes the location (address range) of at least one specified region whose data block is to be rewritten.

The destination determiner 622 includes a data table T that has stored therein a relationship between each of the voltage regulator 4 and the rewriter 100 and a corresponding one of the IDs.

Specifically, the destination determiner 622 is operative to determine whether the destination of the charge control device 6 is the voltage regulator 4 or the rewriter 100 based on the data table T and a communication frame; this communication frame is sent from any one of the voltage regulator 4 and the rewriter 100 at the point of time when it is connected to the charge control device 6.

The rewrite information receiver 624 is operative to:

receive the communication frame sent from the rewriter 100;

convert the received communication frame sent from the rewriter 100 into the rewrite information indicative of the rewrite instruction, a new control program, and/or a new item of control data; and pass the converted rewrite information to the rewrite controller 620.

Next, a rewrite task to be executed by the charge control device 6 microprocessor 64 and its peripheries illustrated in FIGS. 5 and 6 in accordance with the rewrite program stored in the flash memory 66 will be described hereinafter. For example, the rewrite program is launched regular intervals after the charge control device 6 has been energized.

Figure 8:
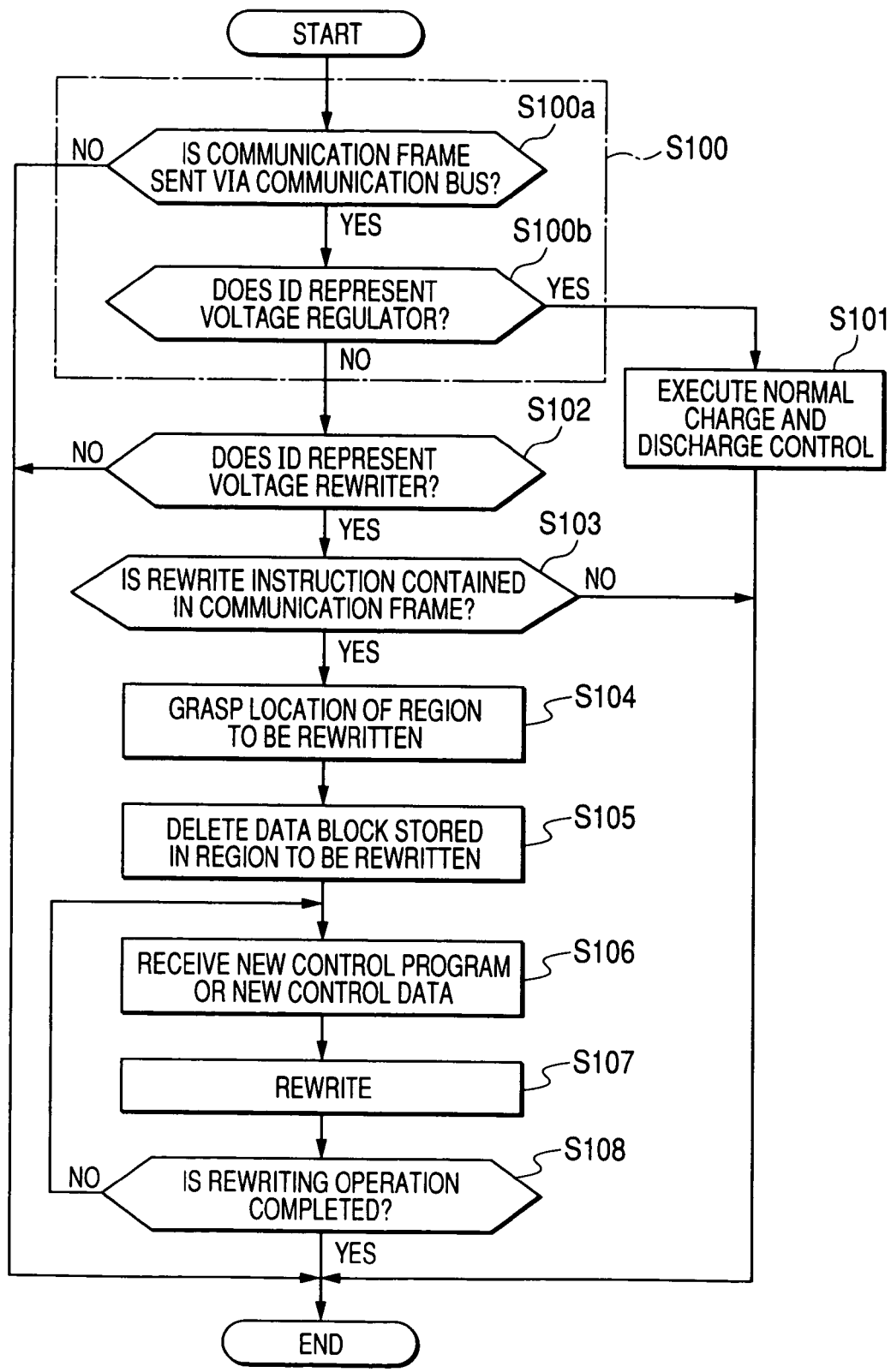
FIG. 8 is a flowchart schematically illustrating an example of a rewrite task to be executable by a microcomputer of the charge control device according to the embodiment.

When the rewrite program is launched, the destination determiner 622 (microcomputer 64) determines whether the voltage regulator 4 (alternator 3) is connected to the communication bus 20 in step S100 of FIG. 8.

Specifically, the destination determiner 622 determines whether a communication frame is sent through the communication bus 20 in step S100a.

For example, when a user wants to rewrite at least one of the control programs 66a or at least one of the items of the control data 66b, the user connects the communication connector 95 of the rewriter 100 to one end of the communication bus 20 the other end of which has been connected to the communication connector 79 of the charge control device 6.

Figure 9:
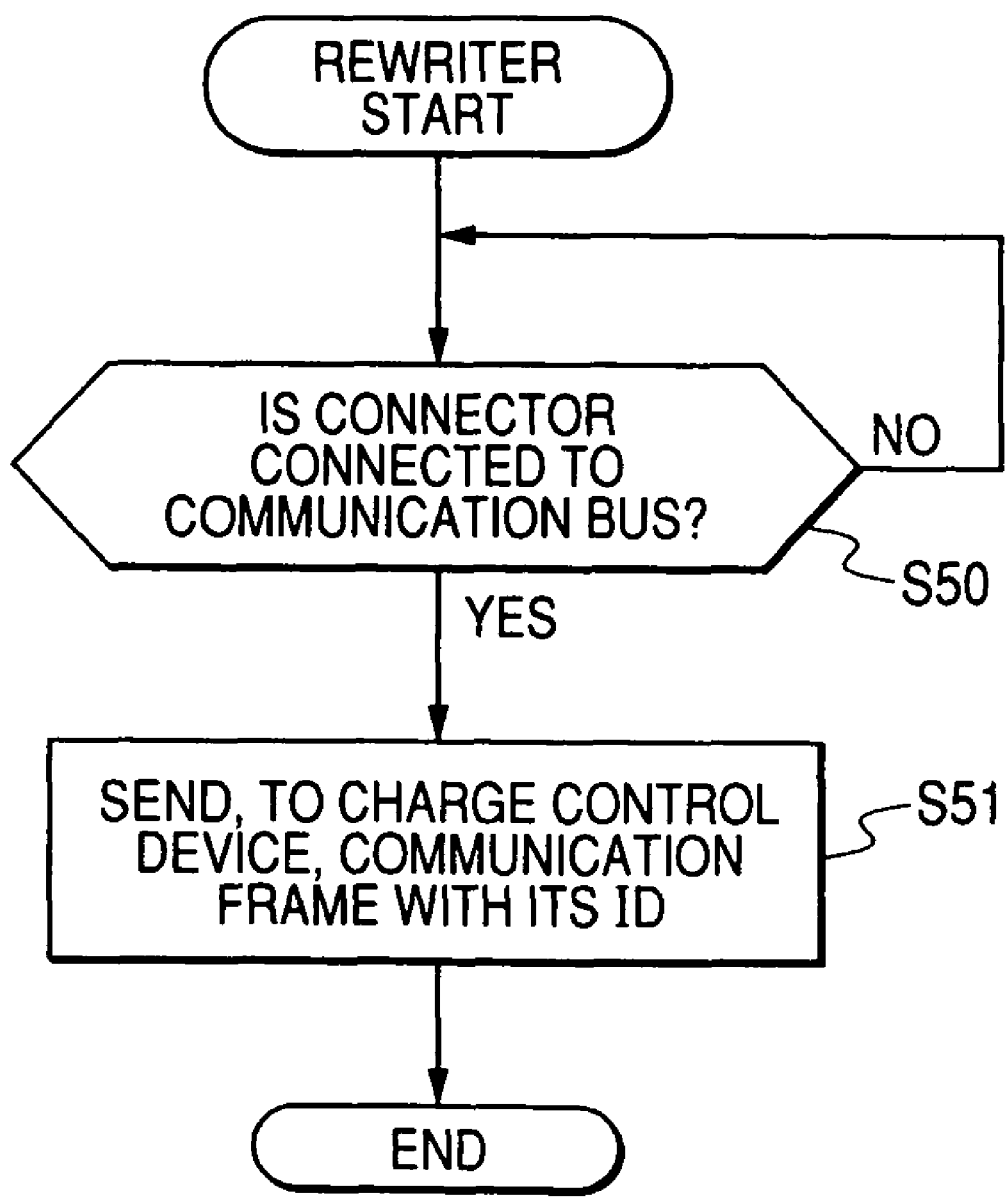
FIG. 9 is a flowchart schematically illustrating an example of a task to be executable by the rewriter according to the embodiment.

When energized before and after the connection of the rewriter 100 to the charge control device 6, the rewrite processor 80 determines whether the communication connector 95 is connected to the communication bus 20 in step S50 of FIG. 9.

When it is determined that the communication connector 95 is not connected to the communication bus 20 (the determination in step S50 is NO), the rewrite processor 80 periodically repeats the determination in step S50.

Otherwise, when it is determined that the communication connector 95 is connected to the communication bus 20 (the determination in step S50 is YES), the rewrite processor 80 sends, to the charge control device 6 via the communication controller 84 and the driver 86, a communication frame in which the ID of the rewriter 100 is stored in step S51.

At that time, because the communication frame with the rewriter's ID sent from the rewriter 100 is received by the driver 70, the determination in step S100a is YES, and therefore, the destination determiner 622 determines whether an ID is stored in the received communication frame in step S100b. Note that, when the destination in step S100a is NO, the microcomputer 64 exits the rewrite task.

After the determination in step S100a is affirmative, the destination determiner 622 references the data table T to determine whether the ID contained in the received communication frame represents the voltage regulator 4 based on the reference result in step S100b.

When it is determined that the ID represents the voltage regulator 4 (the determination in step S100b is YES), the destination determiner 622 determines that electrical connection between the voltage regulator 4 and the charge control device 6 is established, going to step S101.

In step S101, the microcomputer 64 executes at least one of the control programs 66a to thereby execute charge and discharge control of the battery 5 illustrated in FIG. 2.

Otherwise, when it is determined that the ID contained in the received communication frame does not represent the voltage regulator 4 (the determination in step S100b is NO), the destination determiner 622 proceeds to step S102.

In step S102, the destination determiner 622 determines whether the ID contained in the received communication frame represents the rewriter 100 based on the reference result.

When it is determined that the ID does not represent the rewriter 100 (the determination in step S102 is NO), the microcomputer 64 exits the rewrite task.

Otherwise when it is determined that the ID represents the rewriter 100 (the determination in step S102 is YES), the destination determiner 622 determines that electrical connection between the rewriter 100 and the voltage regulator 4 is established, going to step S103.

In step S103, the rewrite controller 620 determines whether the rewrite instruction is contained in the received communication frame.

When it is determined that the rewrite instruction is not contained in the received communication frame (the determination in step S103 is NO), the rewrite controller 620 exits the rewrite task.

Otherwise, when it is determined that the rewrite instruction is contained in the received communication frame (the determination in step S103 is NO), the rewrite controller 620 proceeds to step S104.

In step S104, the rewrite controller 620 grasps the location of at least one specified region, such as one of the regions A to P in FIG. 7, whose data block is to be rewritten. Next, the rewrite controller 620 sets one bit of the control register 66c corresponding to the specified region to "1" to thereby delete the data block stored in the at least one specified region corresponding to the instructed location.

Thereafter, in step S106, the rewrite controller 620 accesses the rewrite processor 80 via the communication controllers 72 and 84 and the driver 70 and 86 so as to prompt the user to enter a new control program or a new item of control data in a block corresponding to the specified region to be rewritten.

When a new control program or a new item of control data in a block corresponding to the specified region to be rewritten is entered from the operating panel 90 to the rewriter processor 80, the communication frame in which the rewrite information indicative of the new control program or a new item of control data is stored is downloaded to the charge control device 6 from the rewrite processor 80 of the rewriter 100.

At that time, the rewrite information receiver 624 receives the rewrite information in step S106, and the rewrite controller 620 writes the received new control program or new item of control data into the specified region of the flash memory 66 in step S107.

Thereafter, the rewrite controller 620 determines whether rewriting operation for the specified region of the flash memory 66 is completed in step S108.

When it is determined that the rewriting operation is not completed (the determination in step S108 is NO), the rewrite controller 620 and the rewrite information receiver 624 repeat the operations in steps S106 to S108 until the determination in step S108 is affirmative.

Figure 10:
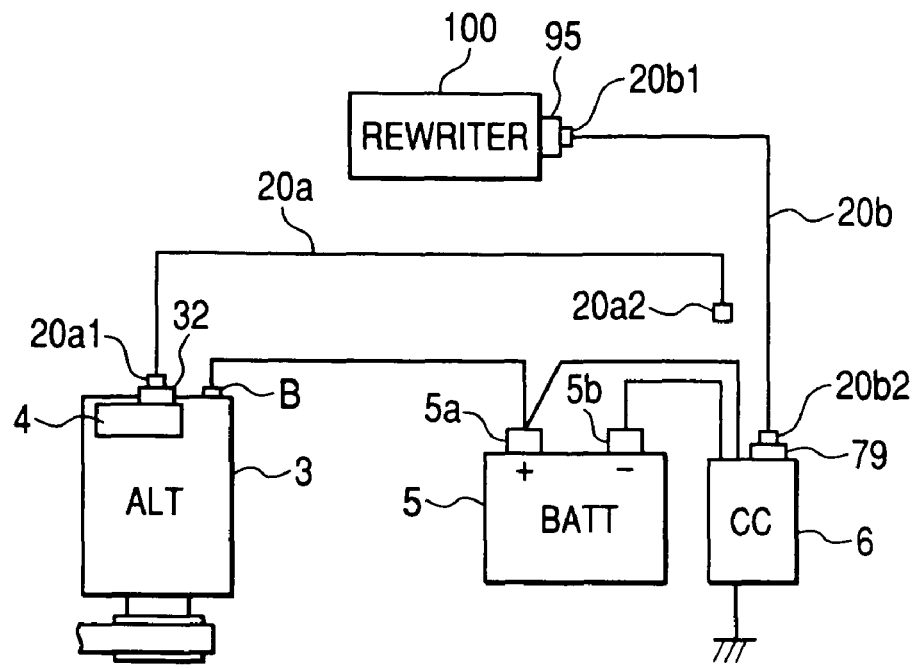
FIG. 10 is a view schematically illustrating a specific example of connection configurations between the charge control device and the voltage regulator and between the charge control device and the rewriter according to the embodiment.

FIG. 10 illustrates a specific example of the connection configurations between the charge control device 6 and the voltage regulator 4 and between the charge control device 6 and the rewriter 100.

As illustrated in FIG. 10, a communication bus 20a for connection between the charge control device 6 and the voltage regulator 4 is connected at its one end and the other end to respective connectors 20a1 and 20a2. The connector 20a1 of the communication bus 20a is removably connectable to the connector 32 of the voltage regulator 4, and the connector 20a2 thereof is removably connectable to the connector 79 of the charge control device 6.

Similarly, a communication bus 20b for connection between the charge control device 6 and the rewriter 100 is connected at its one end and the other end to respective connectors 20b1 and 20b2. The connector 20b1 of the communication bus 20b is removably connectable to the connector 95 of the rewriter 100, and the connector 20b2 thereof is removably connectable to the connector 79 of the charge control device 6.

Specifically, both the shape of the connector 20a2 and that of the connector 20b2 can be matched with that of the connector 79 of the charge control device 6.

A user therefore can select any one of the connectors 20a2 and 20b2 so as to connect it to the connector 79 of the charge control device 6; this allows any one of the voltage regulator 4 and the rewriter 100 to be selectively connected to the charge control device 6.

Figure 11:
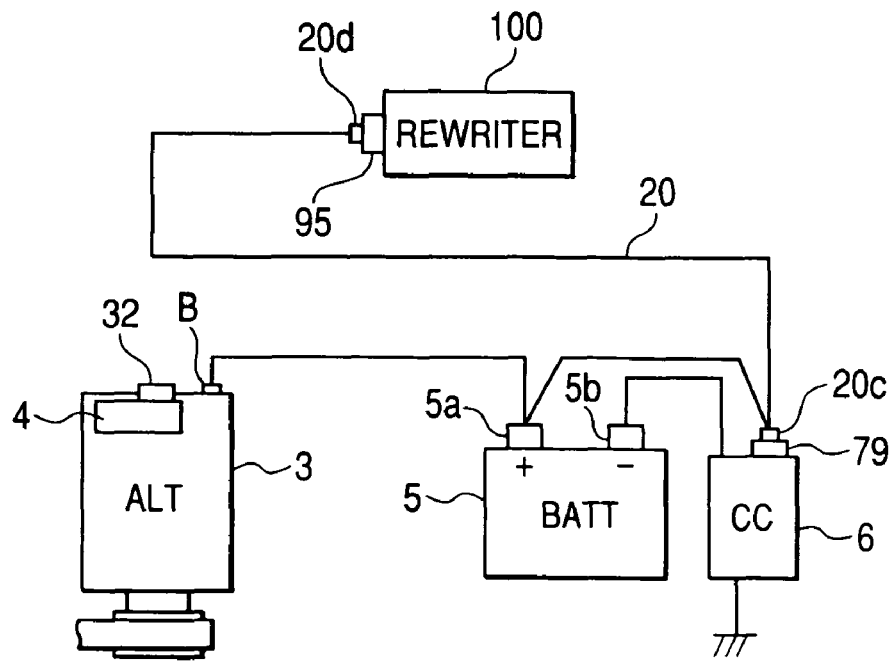
FIG. 11 is a view schematically illustrating another specific example of connection configurations between the charge control device and the voltage regulator and between the charge control device and the rewriter according to the embodiment.

FIG. 11 illustrates another specific example of the connection configurations between the charge control device 6 and the voltage regulator 4 and between the charge control device 6 and the rewriter 100.

As illustrated in FIG. 11, the communication bus 20 is connected at its one end and the other end to respective connectors 20c and 20d. The connector 20c of the communication bus 20 is removably connectable to the connector 79 of the charge control device 6.

The connector 20d of the communication bus 20 is removably connectable to both the connector 32 of the voltage regulator 4 and the connector 95 of the rewriter 100.

Specifically, the shape of the connector 20d of the communication bus 20 can be matched with the shape of the connector 32 of the voltage regulator 4 and that of the connector 95 of the rewriter 100.

A user therefore can connect the connector 20d of the communication bus 20 to selectively any one of the connector 32 of the voltage regulator 4 and that of the connector 95 of the rewriter 100; this allows any one of the voltage regulator 4 and the rewriter 100 to be selectively connected to the charge control device 6.

With the connection configurations illustrated in FIG. 11, the communication cable 20 can be used for connecting between the charge control device 6 and the voltage regulator 4 and between the charge control device 6 and the rewriter 100. For this reason, the connector 79 serves as a connector for connecting between the charge control device 6 and one terminal 5a or 5b of the battery 5. This also allows the connector 20c to accommodate both one end of the communication cable 20 and one end of a connecting wire between one terminal 5a or 5b of the battery 5 and the charge control device 6.

As described above, the charge control device 6 is configured to share the integral communication controller 72 and driver 70 for connection to the voltage regulator 4 installed in the alternator 3 and for connection to the rewriter 100; this rewriter 100 is required to rewrite the contents of the flash memory 66 required to control charge and discharge of the battery 5.

It can be no longer to provide additional dedicated communication tools and connectors for communications between the charge control device 6 and the rewriter 100, making it possible to rewrite the contents of the flash memory 66 without increasing the charge control device 6 in scale and/or cost.

The charge control device 6 is also configured to rewrite the contents of the flash memory 66 while it has been installed in a motor vehicle. This can control charge and discharge of the battery 5 so as to match the SOC thereof with the operating state of the motor vehicle, making it possible to improve the fuel efficiency without the battery 5 being exhausted.

The charge control device 6 is further configured to rewrite the contents of the flash memory 66 before installed in a motor vehicle. This can rewrite default contents of the flash memory 66 of a production-line charge control device 6 immediately after completion without increasing in cost.

In addition, before shipment, the charge control device 6 as supplies for motor vehicles can rewrite at least one control program and at least one item of control data required to control the charge and discharge of the battery 5 so as to meet required specifications. This can eliminate the need to prepare, as supplies for motor vehicle, various types of the charge control device 6 that can meet different required specifications of users.

The charge control device 6 is equipped with the destination determiner 622 configured to determine whether any one of the rewriter 100 and the voltage regulator 4 is connected to the charge control device 6. This can rewrite the contents of the flash memory 66 only when the rewriter 100 is connected to the charge control device 6. This makes it possible to prevent the contents of the flash memory 66 from accidentally being rewritten during execution of the charge and discharge control to thereby improving the reliability of the charging system CS.

Use of the existing connectors of the communication cable (s), the charge control device 6, the voltage regulator 4, and the rewriter 100 based on the specific connection configurations illustrated in FIGS. 10 and 11 can eliminate the need of providing additional dedicated communication tools and connectors for communications between the charge control device 6 and the rewriter 100. This makes it possible to rewrite the contents of the flash memory 66 without increasing the charge control device 6 in scale and/or cost.

Note that, in the embodiment, the control programs and the items of the control data required to control charge and discharge of the battery 5 have been stored in the flash memory 66, but they can be stored in another type of nonvolatile memory, such as EEPROM.

In the embodiment, the charge control device 6 is able to rewrite both control programs and items of control data required to control charge and discharge of the battery 5, but the present invention is not limited to the structure.

Specifically, the charge control device 6 can be configured to enable updating of any one of the control programs and the control data and disable the other thereof. For example, the charge control device 6 can be designed to enable updating of the control data and disable updating of the control programs, making it possible to prevent the control programs from accidentally being updated.

When the number of rewriting of the contents of the flash memory 66 that reaches a predetermined allowed number, the charge control device 6 can be configured to prevent rewriting of the contents of the flash memory 66 after that.

When the maximum number of rewriting of the contents of the flash memory 66 is limited, it is possible to rewrite the contents of the flash memory 66 such that the number of rewriting of the contents of the flash memory 66 is prevented from exceeding the maximum number. This can stop the flash memory 66 being damaged due to over-rewriting.

Figure 12:
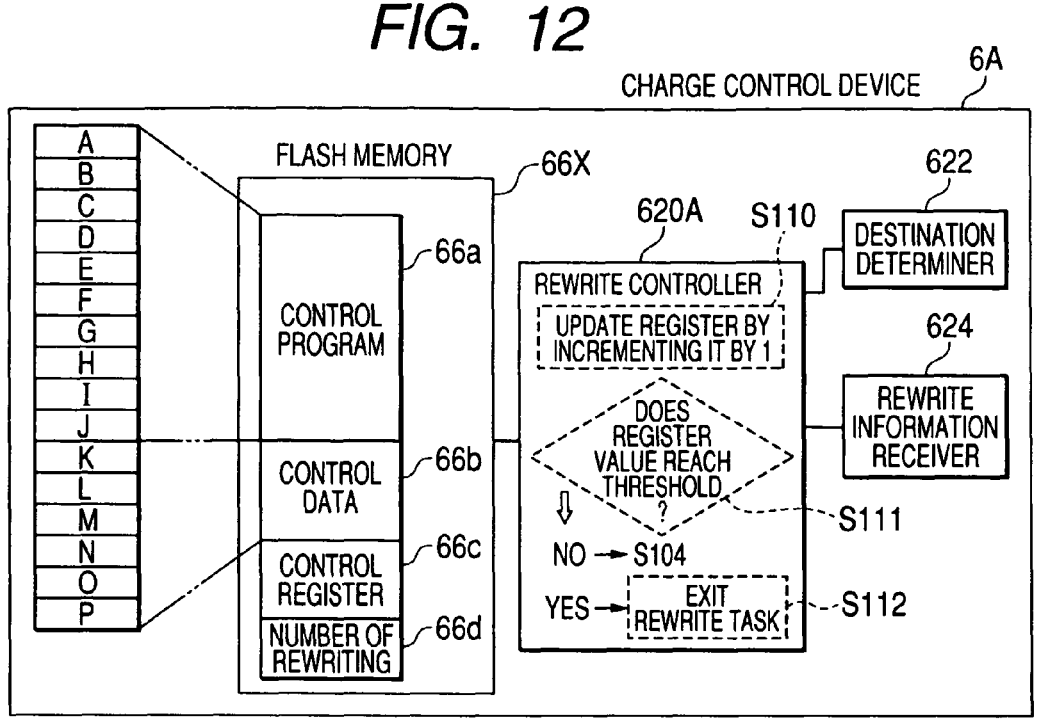
FIG. 12 is a block diagram schematically illustrating an example of the structure of a modified charge control device according to the embodiment.

FIG. 12 schematically illustrates an example of the structure of a modified charge control device 6A.

As illustrated in FIG. 12, a memory region of a predetermined size has been allocated in a flash memory 66X as a register indicative of the number of rewriting for the flash memory 66; a default value of "0" is stored in the register 66d.

Specifically, in step S110, a rewrite controller 620A of the modified charge control device 6A is programmed to update the register 66d to increment the value stored therein by "1" every time the determination in step S108 is affirmative in FIG. 8, in other words, every time the rewriting operation of the flash memory 66 is completed in step S108. Thereafter, the rewrite controller 620A exits the rewrite task.

After completion of the rewrite task, when the next rewrite task is launched, the rewrite controller 620A is programmed to check whether the value stored in the register 66d reaches a predetermined threshold value corresponding to an allowed maximum number for the rewriting in step S111

When it is checked that the value stored in the register 66d reaches the predetermined threshold value (the determination in step S111) is YES, the rewrite controller 620A forcibly terminates the rewrite task without executing the rewrite operation in step S112.

As an additional modification of the modified charge control device 6A, the value of the register 66d can be prepared for each of the regions A to P.

Specifically, in step S110, the rewrite controller 620A can be programmed to update the value of the register 66d corresponding to one specified region to increment the value stored therein by "1" every time the rewriting operation for the specified region of the flash memory 66X is completed in step S108. Thereafter, the rewrite controller 620A exits the rewrite task.

In the additional modification, lets us assume that an allowed maximum number of rewriting of one region in the flash memory 66X is different from that of another one region therein.

In this assumption, it is possible to rewrite data stored in each of the regions in the flash memory 66X such that the number of rewriting of data stored in each of the regions in the flash memory 66X is prevented from exceeding the allowed maximum number for a corresponding one of the regions. This makes it possible to effectively use the overall storage area of the flash memory 66X.

In the embodiment, the rewrite program has been stored in the flash memory 66, but it can be loaded to the charge control device 6 from the rewriter 100 when the rewrite task illustrated in FIG. 8 is executed.

Figure 13:
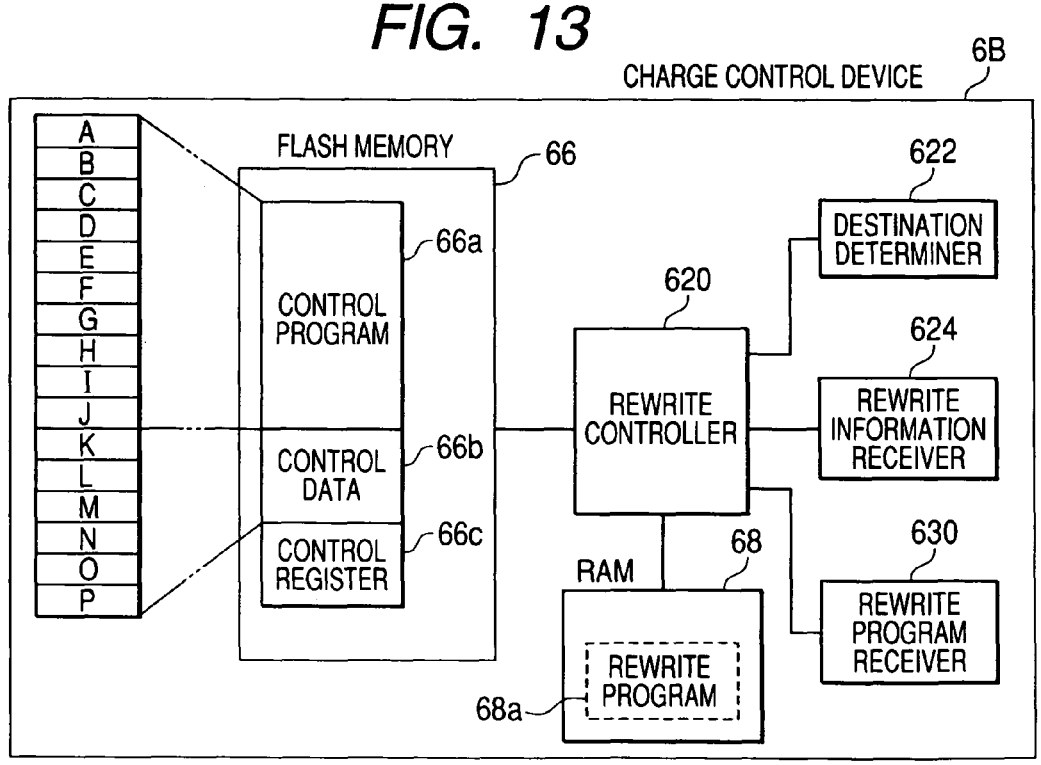
FIG. 13 is a block diagram schematically illustrating an example of the structure of a further modified charge control device according to the embodiment.

FIG. 13 schematically illustrates an example of the structure of a further modified charge control device 6B.

The charge control device 6B includes, as the second function F2, a rewrite program receiver 630 in addition to the structure of the second function F2 of the charge control device 6.

The charge control device 6B also includes a RAM 68.

Specifically, when starting to execute the rewrite task, the rewrite program receiver 630 of the charge control device 6B is programmed to access the rewrite processor 80 of the rewriter 100 to download the rewrite program (see "68a" in FIG. 13) from the rewriter 100 based on the access result.

The rewrite program 68a downloaded from the rewriter 100 is stored in the RAM 68.

The microcomputer 64 runs the rewrite program 68a stored in the RAM 68 to implement the rewrite controller 620 to thereby execute the rewrite task illustrated in FIG. 8.

This can eliminate a storage capacity in the flash memory 66 required to store the rewrite program 68a, making it possible to reduce the memory size of the flash memory 66 and therefore to reduce the charge control device 6B in cost.

In the embodiment, as a communication circuit to which the rewriter 100 is connected, an existing communication circuit of the charge control device 6, such as the communication controller 72, the driver 70, and the connector 79, to which the voltage regulator 4 is to be connected, is used, but the present invention is not limited to the structure.

Specifically, as a communication circuit to which the rewriter 100 is connected, an existing communication circuit of the charge control device 6 to which another in-vehicle control unit (ECU), in-vehicle LAN, or a malfunction diagnosis device is to be connected, can be used.

As another in-vehicle control unit, a control unit for a transmission, a control unit for a brake system, or a control unit for suspension can be used.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A charge control device designed to execute charge control for a battery by controlling an output power of a power generator for a vehicle, the charge control device comprising:
   a nonvolatile memory configured to store therein a control program and control data required to execute the charge control for the battery;
   a rewriting unit configured to rewrite a content of the nonvolatile memory based on information inputted from an external device; and
   a communication circuit that is connected to the external device upon rewrite of the content of the nonvolatile memory by the rewriting unit so that the external device and another device installed in the vehicle are selectively connected to each other,
   wherein selection of any of the external device and the other device to which the communication circuit is to be connected is performed by connection of the communication circuit to any of the external device and the other device via a communication line.

2. A charge control device according to claim 1, wherein the other device is a control device except for the charge control device.

3. A charge control device according to claim 2, wherein the other device is a power controller installed in the power generator and configured to control the output power of the power generator.

4. A charge control device according to claim 1, further comprising:
   a destination determining unit configured to determine whether a communication destination of the charge control device is any of the external device and the other device based on which of the external device and the other device is communicably connected to the communication circuit,
   wherein the rewriting unit is configured to start the rewrite of the content of the nonvolatile memory when it is determined that the communication destination of the charge control device is the external device.

5. A charge control device according to claim 1, wherein the rewriting unit is configured to rewrite the content of the nonvolatile memory in response to a rewrite instruction entered from the external device.

6. A charge control device according to claim 1, wherein the communication circuit is removably connected to a common connector, the external device is communicably connected to one end of a first communication cable provided with a first connector at another one end thereof, the other device is communicably connected to one end of a second communication cable provided with a second connector at another one end thereof, the first connector has a shape removably connectable to the common connector, the second connector has a shape removably connectable to the common connector.

7. A charge control device according to claim 1, wherein the communication circuit is connectable to one end of a communication cable, another one end of the communication cable is connected to a third connector, each of the external and other devices has a fourth connector whose shape is removably connectable to the third connector.

8. A charge control device according to claim 1, wherein the rewriting unit further comprises:
   an update data receiving unit configured to receive update data sent from the external device, the rewriting unit being configured to rewrite the content of the nonvolatile memory into the received update data.

9. A charge control device according to claim 1, further comprising:
   a rewrite program receiving unit configured to receive a rewrite program sent from the external device; and
   a storage unit configured to rewritably store therein the received rewrite program,
   wherein the rewriting unit is configured to run the rewrite program so as to execute the rewrite of the content of the nonvolatile memory.

10. A charge control device according to claim 1, wherein the control program causes the rewriting unit to execute the charge control for the battery, the control program is stored beforehand in the nonvolatile memory with a first flag indicative of disabling of the rewrite of the control program, the control data is stored beforehand in the nonvolatile memory with a second flag indicative of enabling of the rewrite of the control data, and the rewriting unit is configured to:
reference the first flag and the second flag; and
rewrite only the control data based on the on a reference result.

11. A charge control device according to claim 1, wherein the control data required to execute the charge control for the battery is stored beforehand in the nonvolatile memory with a third flag indicative of a maximum number of rewriting of the data stored in the nonvolatile memory, and
the rewriting unit is configured to:
repeat the rewrite of the content of the nonvolatile memory;
count a number of repetitions of the rewrite of the content of the nonvolatile memory;
determine whether the counted number reaches the maximum number by referencing the third flag; and
prevent the rewrite of the content of the nonvolatile memory when it is determined that the counted number reaches the maximum number.

12. A charge control device according to claim 11, wherein the control data stored in the nonvolatile memory is composed of a plurality of blocks of a predetermined size,
the rewriting unit being configured to:
repeatedly rewrite the content of the nonvolatile memory in units of blocks; and
execute the determination of whether the counted number reaches the maximum number in units of the blocks.

13. A charge control device according to claim 1, wherein the other device is an external device with respect to the charge control device.

* * * * *